UNITED STATES PATENT OFFICE.

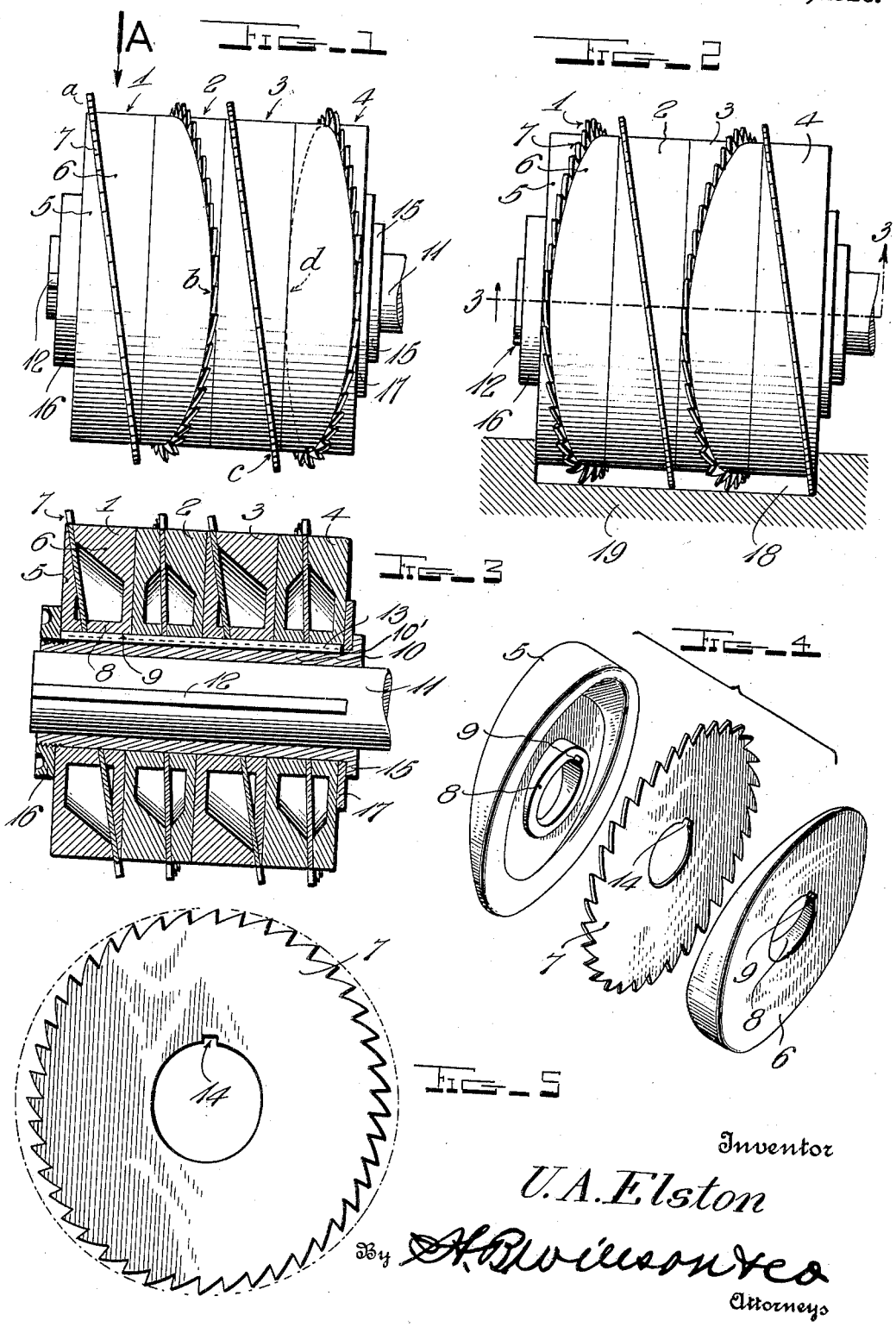

URIAL A. ELSTON, OF WILKES-BARRE, PENNSYLVANIA.

CUTTER-HEAD.

1,358,533.   Specification of Letters Patent.   Patented Nov. 9, 1920.

Application filed April 26, 1920. Serial No. 376,774.

*To all whom it may concern:*

Be it known that I, URIAL A. ELSTON, a citizen of the United States, residing at Wilkes-Barre, in the county of Luzerne and State of Pennsylvania, have invented certain new and useful Improvements in Cutter-Heads; and I do declare the following to be a full, clear, and exact description of the invention, such as will enable others skilled in the art to which it appertains to make and use the same.

This invention relates to an improved cutter head of the rotary type used for cutting and smoothing portions of tires to be repaired and for cutting and leveling the soles and heels of shoes or for purposes where it is desired to cut off the face of an article. It could be used for trimming any surface or for grinding material and if made of a proper size could be used for grinding logs to form wood pulp.

One object of the invention is to so construct this trimmer head that the cutting disks may extend in relatively overlapping position but at the same time prevent them from coming into close contact and thereby prevent the material cut-off from clogging between the adjacent portions of the cutting disk.

Another object of the invention is to so construct the trimmer head that the cutting disks may be securely clamped in place between clamping disks mounted upon a hub which is to fit upon a rotatable shaft.

Another object of the invention is to so construct this trimmer head that it may be assembled in a very efficient manner and taken apart and re-assembled without the various elements becoming mixed. This invention is illustrated in the accompanying drawings wherein Figure 1 is a view showing the improved trimmer head in side elevation.

Fig. 2 is a view similar to Fig. 1 but looking down upon the trimmer head in the direction of the arrow indicated by the letter "A" in Fig. 1.

Fig. 3 is a longitudinal sectional view taken along the line 3—3 of Fig. 2.

Fig. 4 is a group view showing in perspective one of the cutting blades and the clamping disks between which the blade will fit.

Fig. 5 is a view looking at the side face of one of the cutting blades.

This trimmer or cutter is formed of a plurality of units indicated in general by the numerals 1, 2, 3 and 4 in the assembled views, one of the units being shown in perspective in Fig. 4. In the present form there has been disclosed a cutter head having four units but it is to be understood that this number may be varied according to the size of cutter head desired. Each of these units or sections is provided with the clamping disks 5 and 6 between which the teeth of the cutting blade 7 will fit with the periphery of the blade extending beyond the periphery of the section. These clamping disks will each have its inner face cut diagonally or at an incline to its outer face and will therefore provide a clamping disk which tapers to a feathering edge as shown. It should be noted that the two disks are similarly cut so that when placed upon opposite sides of the cutting blade there will be provided a unit having a cylindrical construction. These disks will each be provided with a hub 8 having a key-way 9 formed therein and the disks will be cut out from their inner faces as shown in Figs. 3 and 4, thus providing disks which will be relatively light in weight.

These units or sections fit upon a sleeve 10 which fits upon the shaft 11 and will be provided with a key-way to receive the key 12 of the shaft and thus prevent the shaft from rotating without rotating the cutter head with it. This sleeve 10 is in its turn provided with a key-way 10' to receive the locking key 13 which passes through the key-ways 9 of the disks 5 and 6 and through a key-way 14 formed in each of the cutting blades 7 and the disks and cutting blades will thus be held against turning upon the sleeve 10. At one end the sleeve is provided with a head 15 and at the opposite end the sleeve will be threaded for carrying a clamping nut 16 which will be screwed tight and thus tightly clamp the sections of the cutter head between the clamping nut and the head 15. If desired, a washer 17 may be placed between the head 15 and the section 4 of the cutter head and a similar washer may, if desired, be placed between the section 1 and the clamping nut 16.

When this cutter head is assembled, the sections will be in place upon the sleeve and clamped tight by means of the clamping nut 16 and the sleeve will then be secured upon the shaft 11. When these cutting blades 7 are first stamped out they will be cut circular as indicated by the dotted lines in Fig. 5. They do not extend at right angles to the axis of the shaft and therefore when in place they would not extend an even distance beyond the peripheries of the sections or units at all points. The shaft will therefore be rotated and a suitable grinding element brought into engagement with the rapidly rotating cutter head and this will cause the superfluous portions of the teeth to be ground off. Therefore, although the disks will now be substantially elliptical if removed from the head and viewed as shown in Fig. 5, they will present a perfect circle when in place and will extend beyond the cylindrical body portion an even distance at all points.

Referring particularly to Figs. 1 and 2, it will be noted that when the device is assembled the sections will be so placed that the feathered portions of the disks will not be positioned in alinement longitudinally of the head but will be positioned relatively in spaced relation about the circumference of a circle. In the preferred form they will be distributed according to the number of units made use of and in the form disclosed having four units, these points which have been designated $a$, $b$, $c$, and $d$ will be positioned ninety degrees apart. From an inspection of these figures, it will also be noted that since the cutting blades extend diagonally of the units they will at oppositely disposed points extend beyond the side faces of the units and therefore the cutting blade of one unit will extend relatively in overlapping relation to the cutting blade of the adjacent units. It will thus be seen that as the cutter head rotates the surface operated upon by the cutting blade of one unit will be overlapped by the surface operated upon by the adjacent unit and an uncut portion will not be left between the surfaces operated upon. Therefore, if the device is used as shown in Fig. 2 a cut or kerf 18 may be formed in a log or other piece of wood 19 which will be evenly cut throughout its width. It will be further noted that since the blades extend in diverging relation to each other instead of parallel the teeth which engage the article ground will tend to move the cutter head in different directions longitudinally of the shaft 11 and therefore they will act against each other and this will prevent end thrust and the cutter head will not be moved longitudinally of the shaft.

It will thus be seen that there has been provided a cutter head so constructed that the cutter blades will extend in relatively overlapping relation but since they are positioned as shown in Figs. 1 and 2 they will not at any point about the circumference of the cylindrical head meet in contacting relation. Therefore there will always be a space provided between the cutting blades and there will be no tendency for the material cut-off to collect between the cutting blades and thus choke up the teeth of the cutting blades.

It will be further noted that there has been provided a cutter head which can be easily and accurately assembled since it is simply necessary to first assemble the device and then grind the blades to the proper shape and then after taking the device apart sharpen and re-set the cutting teeth and then re-assemble the device.

I claim:

1. A cutter comprising a rotatable body, and annular cutting elements carried by the body, the cutting elements extending in diverging relation to each other and each extending relatively in overlapping relation to its adjacent cutting elements with the relatively overlapping portions of the cutting elements positioned in spaced relation about the arc of a circle.

2. A cutter comprising a rotatable carrier, and a plurality of cutting blades carried thereby and extending obliquely to each other with the relatively adjacent portions of the blades positioned in spaced relation about the arc of a circle.

3. A cutter comprising a shaft engaging sleeve, blade clamping disks mounted upon the sleeve and held against rotation thereon, the blade engaging faces of the disks being cut diagonally of the sleeve, and cutting blades clamped between the disks and extending beyond the peripheral faces of the disks and at points beyond the side faces thereof to position portions of the blades relatively in overlapping relation, the disks being set upon the sleeve to position the overlapping portions of the blades in spaced relation about the circumference of a circle and out of contact with each other.

In testimony whereof I have hereunto set my hand.

URIAL A. ELSTON.

Witnesses:
 EDWARD IRVING SCHEBE,
 THOMAS WRIGHT WALTON.